United States Patent
Pearce

(10) Patent No.: US 11,725,152 B2
(45) Date of Patent: Aug. 15, 2023

(54) SYSTEM AND METHOD OF REDUCING EMISSIONS AND INCREASING SWELL IN AN OIL CONDITIONING PROCESS

(71) Applicant: Maze Environmental LLC, Cypress Mill, TX (US)

(72) Inventor: Brooks Pearce, Cypress Mill, TX (US)

(73) Assignee: Maze Environmental LLC, Cypress Mill, TX (US)

( * ) Notice: Subject to any disclaimer, the term of this patent is extended or adjusted under 35 U.S.C. 154(b) by 0 days.

(21) Appl. No.: 17/488,819

(22) Filed: Sep. 29, 2021

(65) Prior Publication Data

US 2022/0389332 A1 Dec. 8, 2022

Related U.S. Application Data

(60) Provisional application No. 63/196,154, filed on Jun. 2, 2021.

(51) Int. Cl.
*B01D 19/00* (2006.01)
*C10G 53/02* (2006.01)
*B01D 3/14* (2006.01)

(52) U.S. Cl.
CPC ......... *C10G 53/02* (2013.01); *B01D 19/0073* (2013.01)

(58) Field of Classification Search
None
See application file for complete search history.

(56) References Cited

U.S. PATENT DOCUMENTS

| | | |
|---|---|---|
| 2,970,107 A | 1/1961 | Gilmore |
| 3,091,586 A | 5/1963 | Pappas |
| 3,819,511 A | 6/1974 | Peiser et al. |
| 4,673,490 A | 6/1987 | Subramanian et al. |
| 4,960,443 A | 10/1990 | Lansford |
| 5,645,692 A | 7/1997 | Gourlia et al. |
| 5,968,346 A | 10/1999 | Jung et al. |
| 6,016,667 A | 1/2000 | Doerler et al. |
| 6,311,516 B1 | 11/2001 | Key et al. |
| 7,172,686 B1 | 2/2007 | Ji et al. |
| 7,740,691 B2 | 6/2010 | Cash et al. |

(Continued)

FOREIGN PATENT DOCUMENTS

| | | |
|---|---|---|
| EP | 0213791 A2 | 3/1987 |
| GB | 728234 A | 4/1955 |
| RU | 2553734 C1 | 6/2015 |

OTHER PUBLICATIONS

Typical Crude Stabilization System, Diagram, retrieved online: https://www.sib.com/-/media/files/testing-services/other/epf-crude-oil-treatment; retrieved on Nov. 18, 2021; 1 page.

(Continued)

*Primary Examiner* — Philip Y Louie
(74) *Attorney, Agent, or Firm* — Shannon W. Bates; Harper & Bates LLP

(57) ABSTRACT

A system for conditioning live crude oil to produce stabilized oil that can be stored in a conventional oil storage tank and hydrocarbon gas includes a stabilizer tower and a heater treater. The stabilizer tower receives oil from separators at the wellhead production facility and outputs oil to the heater treater. The heater treater outputs gas back into the stabilizer tower and, optionally, recycles a portion of oil output back into the heater treater, which enhances oil output.

10 Claims, 5 Drawing Sheets

(56) References Cited

U.S. PATENT DOCUMENTS

| | | | |
|---|---|---|---|
| 7,842,121 B2 | 11/2010 | Sanderson et al. | |
| 8,864,881 B2 | 10/2014 | Suppiah et al. | |
| 9,109,166 B2 | 8/2015 | Van Amelsvoort et al. | |
| 9,988,581 B2 | 6/2018 | Meyer | |
| 10,287,509 B2 | 5/2019 | Mehra et al. | |
| 10,344,219 B2 | 7/2019 | Niccum et al. | |
| 2014/0001097 A1 | 1/2014 | Jothy et al. | |
| 2014/0171705 A1 | 6/2014 | Freet et al. | |
| 2016/0008742 A1* | 1/2016 | Adler | G01F 15/08 700/282 |
| 2017/0121610 A1* | 5/2017 | Niccum | C10G 33/06 |
| 2018/0187095 A1 | 7/2018 | Soliman | |
| 2018/0291282 A1 | 10/2018 | Soliman et al. | |
| 2020/0354640 A1 | 11/2020 | Soliman | |
| 2022/0298438 A1* | 9/2022 | Schmidt | C10G 70/043 |
| 2022/0325188 A1* | 10/2022 | Nanda | B01D 3/143 |

OTHER PUBLICATIONS

Distillation, Heat Recovery Meet RVP Specification for Stabilized Crude, retrieved online: https://www.offshore-mag.com/business-briefs/equipmentengineering/article/16757398/distillation-heat-recovery-meet-rvp-specification-forstabilized-crude, retrieved on Nov. 1, 1999, 11 pages.

* cited by examiner

SYSTEM AND METHOD OF REDUCING EMISSIONS AND INCREASING SWELL IN AN OIL CONDITIONING PROCESS

CROSS-REFERENCE TO RELATED APPLICATIONS

This application claims the benefit of priority to U.S. Provisional Application No. 63/196,154, filed Jun. 2, 2021, which is incorporated herein by reference.

BACKGROUND

The present invention relates to oil and gas production, and more particularly to technology for conditioning or stabilization of live crude oils at the outlet of the extraction well.

The output of oil and gas well-heads typically includes oil, water, and gas, often in an emulsion, at pressures between approximately 150 PSI and 1,500 PSI (10 and 100 bars). The process partial distillation of live crude oil and reducing the well-head pressure according to API standards is referred to as stabilization.

In a typical stabilization process, illustrated in FIG. 1, a live crude oil stream 1320 (including oil, gas, and water) from a wellhead 1220 first goes to a separator 1230. The separator 1230 reduces the pressure of the live crude stream 1320 and outputs an oil stream 1332, a gas stream 1334, and a water stream 1336. Among the output streams from the separator 1230, gas 1334 released from emulsion can go directly to sale, water 1336 removed from the bottom can go to a storage and/or treatment facility, and oil 1332 can go to a tank 1235 for holding for additional stabilization, as oil stream 1332 typically contains light hydrocarbons and water and is at higher than atmospheric pressure, after processing only by the separator 1230.

In many conventional systems, oil 1332 is pumped from the tank 1235 into a heater treater 1240, which typically outputs an oil stream 1342, a gas stream 1344, and a water stream (not shown in FIG. 1). Gas stream 1344 can go to a vapor recovery compressor 1260 or like device, as gas 1344 is moved for sale. Oil stream 1342 can go to a stabilizer tower 1250, which can output a gas stream 1354 and an oil stream 1352. Gas stream 1354 can go to a vapor recovery compressor 1260 or like device, as gas 1354 is moved for sale. Oil stream 1352 is stabilized to the degree that is can be stored in a conventional stabilized crude oil tank 1270 at or near atmospheric pressure. Each of the prior art components are explained below.

In general, a separator is a pressure vessel that, in a two-phase unit, receives a process flow for a retention time that allows lighter hydrocarbons to escape from the flow stream as a gas. In a three-phase separator, water also settles out from the oil for removal beneath the oil outlet of the separator. A separator generally includes internal portions or devices to promote separation, sometimes referred to as gravity settling, of the oil and water and release the gas. Often a mist extractor is used to remove liquid droplets from the gas. A separator often includes a liquid-level controller and a means to control internal pressure.

Often several stages of separation are employed, depending on the particular process variables of the site, to reduce to reduce pressure in stages. The separator is sometimes referred as a Trap, a Knockout vessel, a flash chamber, an expansion vessel, or the like. Typically, the separator 1230 is near wellhead 1220, although in some installations may be located a mile away. Many separator designs have been developed, and the explanation of separator in general and/or separator 1230 is not intended to be limiting in any way.

In general, a heater treater, such as heater treater 1240, is a 3-phase vessel that utilizes heat and mechanical separation devices for further separating the oil stream 1332 from the separator 1230 into an oil stream 1342, a gas stream 1344, and a water stream 1346. Heater treaters typically includes a degassing section, a heating section, differential oil control, and a coalescing section, although not every section is required to meet the definition of a heater treater.

Oil stream 1332 (or untreated, live oil in installations that do not have an initial separator, such as separator 1230) enters the degassing section via an inlet—often at the top of the vessel. Gases 1344 that are easily released are vented into a gas collection line that often includes a mist extractor, to produce gas stream 1354. Water within the oil stream 1332 can drop to the bottom of the vessel for removal at a water outlet. After initial degassing, the emulsion passes into a heating section, which often includes a tube-type heat exchanger to approximately 100 to 160 degrees F. Some heater treaters have a section containing a filtering medium to screen solid particles out of the oil. This process of heating the crude at this stage decreases the oil viscosity and promotes separation of the oil and water.

In some embodiments, a heater treater includes a coalescing section that can includes a spreader and an electrostatic device that passes alternating current through the emulsion to promote formation of water droplets, which promotes separation of the water droplets by gravity. The remaining "dry" oil can be removed from the heater treater by an oil outlet at an appropriate location on the heater treater unit.

Many heater treaters designs have been developed, including vertical and horizontal configurations, the choice of which depends on the particular desired parameters, such as design throughput, cycle time, and like factors.

Upon exiting the heater treater 1240, the oil stream 1342 can go to a stabilizer tower 1250. In general, a stabilizer tower, such as stabilizer tower 1250, typically includes trays, structured packing, and/or random packing in a column to promote contact between the vapor and liquid phases, permitting the transfer of mass and heat from one phase to the other. The trays have orifices for dispersing the gas uniformly on the tray and through the liquid on the tray. Types of trays include valve, bubble cap, and perforated-types. Structured packing often are perforated plates that are folded and/or welded together. Random packing is available in many sizes, geometric shapes.

Partial fractionation or distillation of the oil often occurs in the stabilizer tower. The heavier components and higher hydrocarbons flow through the column as liquid. Some of the liquid from the bottom of the column is withdrawn and circulated through reboiler in some configurations to add heat to the process. In the reboiler, the lighter components are driven off as a gas. At each tray or stage the rising gas performs a stripping operation such that the lighter components in the gas increase as the gas rises through the column. Pressure inside the stabilizer column can range typically between 50 to 200 PSIG (3.4 to 14 bars). Other configurations, such as a reflux system, additional heat exchangers, and like equipment and processing may be included.

The stabilized oil stream 1354, often comprising pentane and higher hydrocarbons (C5+), exits the base of stabilizer tower 1250. Oil stream 1354 may then be stored in tank 1270 at or near atmospheric pressure for eventual transport to an oil refinery or like user.

The term "swell" is often used to refer to the increase in volume of an in-ground reservoir fluid (that is, in-ground), which includes oil, when solvent molecules dissolve in the reservoir fluid. In this regard, reservoir oil swell can enhance recovery of oil trapped in inaccessible pore spaces. This specification used the term "swell," also referred to as "uplift," to refer to the volumetric expansion of an oil stream flow rate during processing.

SUMMARY

A system and method for conditioning live crude oil in some embodiments increases volumetric oil output and decreases fugitive emissions relative to prior art systems. A system for conditioning live crude oil can include a separator, a stabilizer tower, and a heater treater that includes feeding a heater treater output gas to the stabilizer tower.

The separator is adapted for receiving live crude oil from a wellhead and for producing a separator oil output and a separator gas output. The separator in some cases is considered part of the wellhead production facility. The stabilizer tower is adapted for (i) receiving the separator oil output and receiving a heater treater gas output and (ii) producing a stabilizer tower oil output and a stabilizer tower gas output.

The heater treater is adapted for (i) receiving the stabilizer tower oil output and (ii) producing a heater treater oil output and the heater treater gas output; wherein the heater treater gas output has a temperature that is higher than the stabilizer tower gas output and the heater treater oil output is stabilized oil. A portion of the heater treater oil output may be recycled to a heater treater inlet.

The system for conditioning live crude oil can include a vapor recovery unit (VRU) adapted for (i) receiving the stabilizer tower gas output and (ii) producing a VRU gas output and a VRU oil output, the heater treater being adapted for receiving the VRU oil output. The VRU can include discrete components and/or a packaged compressor and accessory components, while still being a VRU as used herein.

The heater treater may be adapted for recirculating a recirculating portion of the heater treater oil output into the heater treater. And the recirculating portion of the heater treater oil output may be combined with the VRU oil output upon or before entering the heater treater. The system may yield an oil volumetric production rate output (that is, stabilized oil that may be measured at a stabilized oil tank) that is greater than a volumetric production rate of the oil component of the live crude oil from the wellhead, wherein the volumetric production rates are measured in BOPD.

The live crude oil fed to the conditioning system includes at least an oil component and a gas component, and typically also includes a water component. Thus, the components disclosed herein may be two phase or three phase components. Typically, some aspect of the system will include a water separation capability.

Hydrocarbon gas from the separator and/or from the stabilizer may be sent to at least one of a user, the stabilizer tower, and the heater treater. The stabilizer components may be pre-assembled (that is, in a fabrication facility) and mounted on a skid (that is, a unitary structural steel frame). The heater treater components may also be pre-assembled and mounted on a skid.

The process for conditioning oil, often including increasing swell or uplift, can include steps for operating the system as described (in whole or in part) herein, including providing gas from the heater treater directly to the separator. The process for conditioning live crude oil may include the steps of: receiving a live crude oil stream from a wellhead into a separator, the live crude oil stream including at least an oil component and a gas component; separating a first gas stream from the live crude oil in the separator to create at least a first oil stream; receiving the first oil stream from the separator into a stabilizer tower; separating a second gas stream from the first oil stream in the stabilizer tower to create a second oil stream; receiving the second oil stream into a heater treater; separating a third gas stream from the second oil stream in the heater treater to create a stabilized oil stream and a third oil stream, and circulating the third gas stream from the heater treater to the stabilizer wherein the third gas stream combines with the second gas stream to create a combined second gas stream, the combined second gas stream flowing to a vapor recovery compressor; moving the stabilized oil stream to a stabilized oil tank; and circulating the third oil stream within the heater treater. The stabilized oil stream has a greater volumetric flow rate, measured in BBLD, than the volumetric flow rate of the oil component of the live oil stream, measured in BBLD.

The process may include the step of circulating a recirculating portion of the second gas stream from the stabilizer tower to the heater treater and a conditioned portion of the second gas stream from the stabilizer tower to a user, and may include a step of circulating a recirculating portion of the second gas stream from the stabilizer tower to the heater treater and a conditioned portion of the second gas stream from the stabilizer tower to a user.

The process may include the step of flowing the stabilized oil stream to a stabilized crude oil tank that is approximately at atmospheric pressure. The step of circulating the third oil stream includes inputting the third oil stream at an inlet of the heater treater.

The word stream does not require that the process be perfectly continuous or steady state. For merely one example, dump valves may operate in the equipment such that they close temporarily in response to liquid level in a unit.

DETAILED DESCRIPTION OF ILLUSTRATIVE EMBODIMENTS

Figure 1:
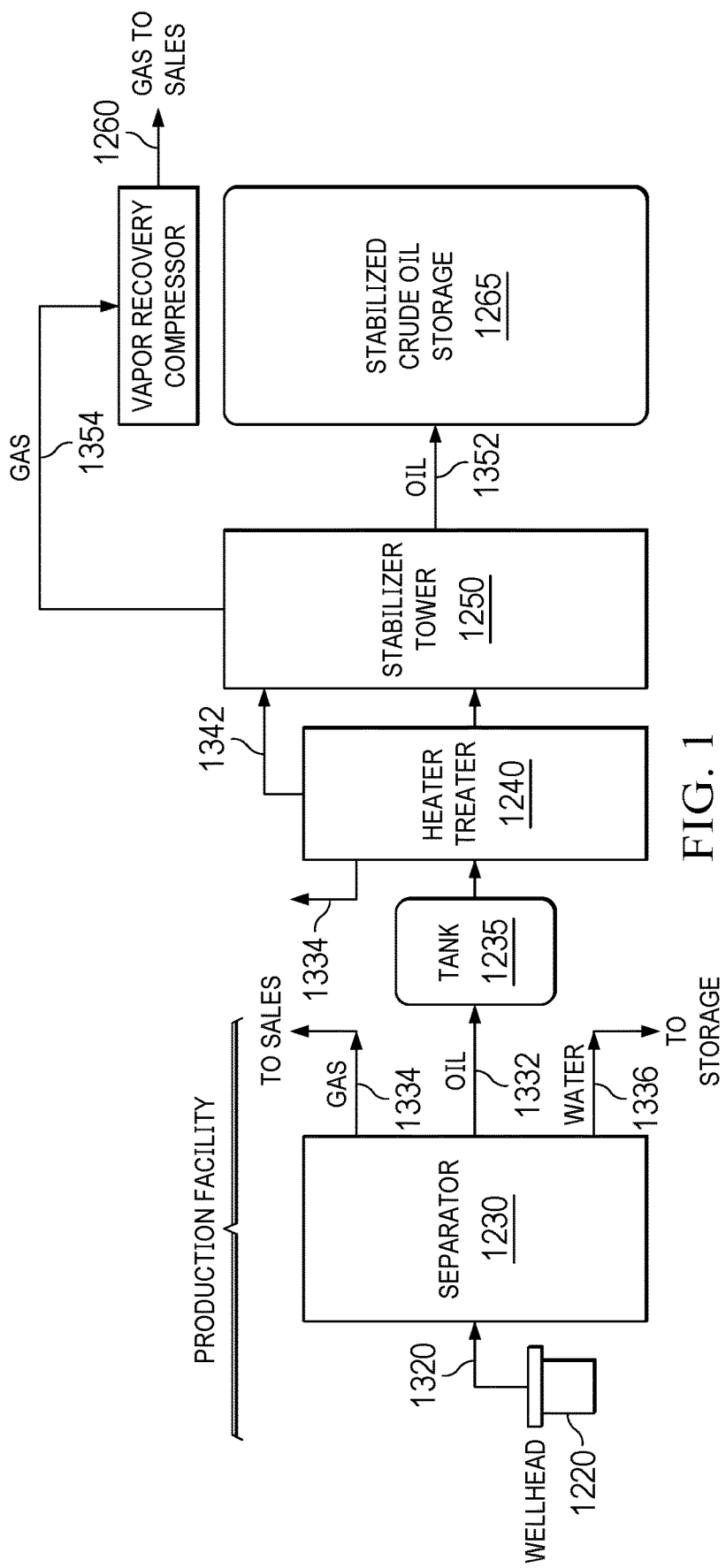
FIG. 1 (Prior Art) is a process flow diagram of a conventional live crude oil stabilization process.

To illustrate a first example of a system for stabilizing crude oil, a system 10 for stabilizing live crude oil includes a separator 30, a stabilizer such as a stabilizer tower 40, a heater treater 50, a vapor recovery unit 60, a stabilized oil tank 70, and an oil and gas recirculation system 80.

Figure 2A:
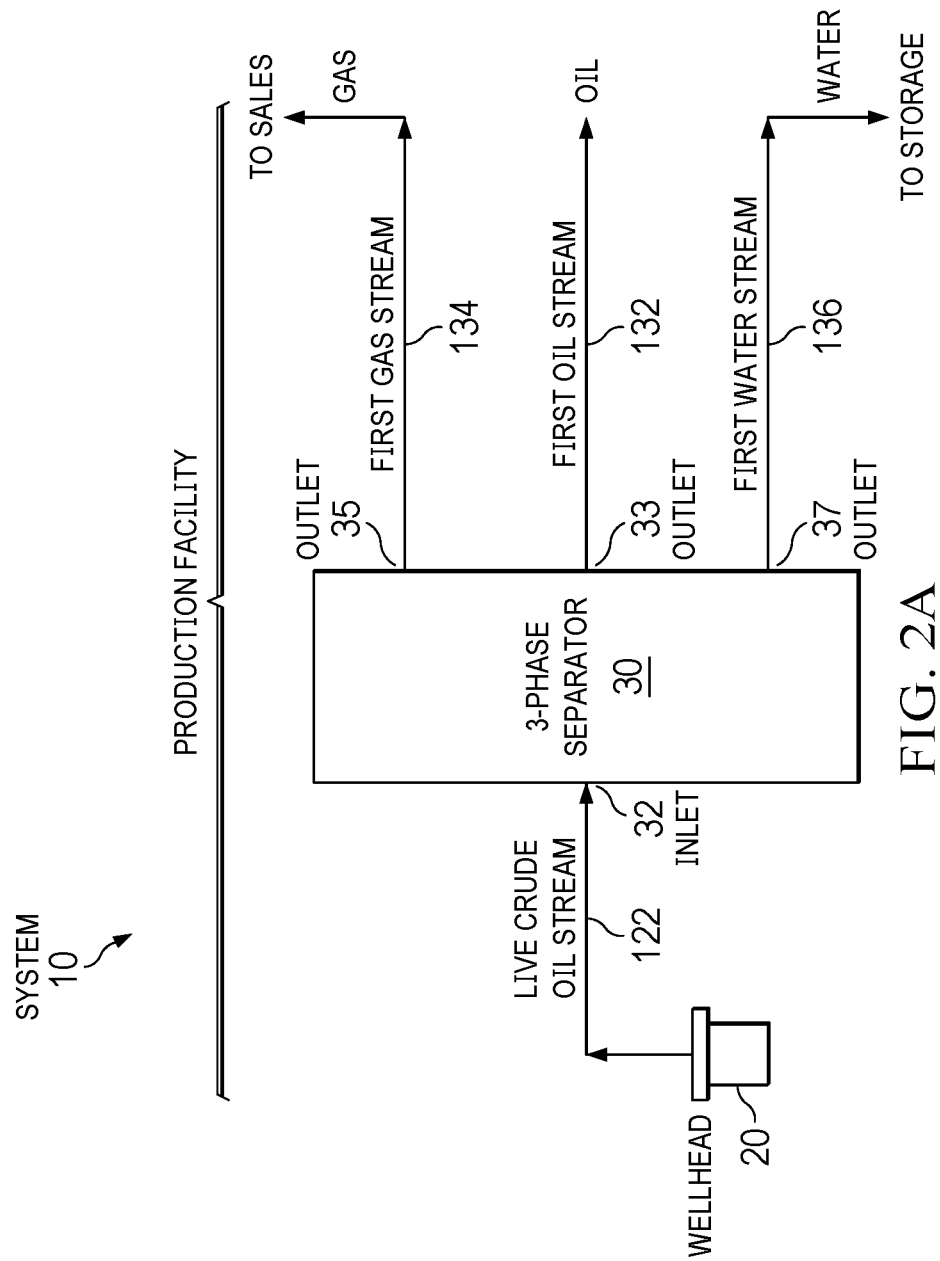
FIG. 2A is a simplified flow process diagram of a first portion of a first example of a live crude oil conditioning process.

As illustrated in FIG. 2A, separator 30 receives a first oil stream 132 from a wellhead 20 at inlet 32. First oil stream or live crude feed 122 typically includes an emulsion of oil, gas, and water directly from wellhead 20. The terms "first oil stream" and "live crude oil" encompasses any conventional wellhead pressures and temperatures and composition of hydrocarbons, according to API specifications. In this regard, wellhead pressures range from 2,000 to 150,000 psi (138 to 10,300 bars). Further the terms "first oil stream" and "live crude oil" encompass any conventional oil and gas stream from a wellhead, including but not limited to emulsions, such as with water or other liquid. It is understood that several wellheads 20 can feed a single separator 30, and the symbol in FIG. 2A for separator 30 can represent several separators in parallel.

Separator 30 is illustrated in FIG. 2A as a vertical separator, including a flow inlet carrying live crude 122 inlet in the top half of the separator 30. The separator 30 produces a separator gas outlet stream 132 (also referred to herein as a first oil stream) at an oil stream outlet 33, a separator gas outlet stream 134 (also referred to herein as a first gas stream) at gas stream outlet 35, and optionally a separator water outlet stream 136 (also referred to herein as a first water stream) at a water outlet 37. The separator water outlet stream is optional, as system 10 encompasses two phase and three phase separators.

Separator 30 may, in some vertical, three-phase configurations, include an inlet diverter and a mist eliminator, an oil level controller and oil dump valve, and a water dump valve. Separator 30 may also (or alternatively) include a downcomer and spreader, an interface controller and water dump valve, and oil weir level controller and oil dump valve. Other configurations of separator 30 and/or multiple stages may be employed. Separator 30 is not limited to vertical separators, as other configurations, such as horizontal separators, may be employed. Separator 30 often is near the one or more wellheads 20, often as close as can be conveniently located. Separator 30 often can be remotely located, such as a mile from the wellhead 20.

Stabilizer tower 40 yields a stabilizer oil output stream 142, also referred to as second oil output stream 142, from an oil outlet 43. Optionally, stabilizer tower 40 can optionally include a stabilizer water output stream 146 from a water outlet 47. Accordingly, stabilizer tower 40 can include a liquid level controller and corresponding valves and instrumentation for operating stabilizer tower 40 as a three-phase process.

The design features of separator 30 may be chosen and designed according to the process conditions, such as pressure, temperature, and live crude feed characteristics, and according to industry standards, as will be understood by persons familiar with oil and gas stabilization. Further, it is understood that separator 30 may include piping, valves, controls, and the like to perform is separation function, such as a gas back pressure valve, flare valve, a gas flow measurement device, and the like in the separator outlet gas stream piping.

Figure 2B:
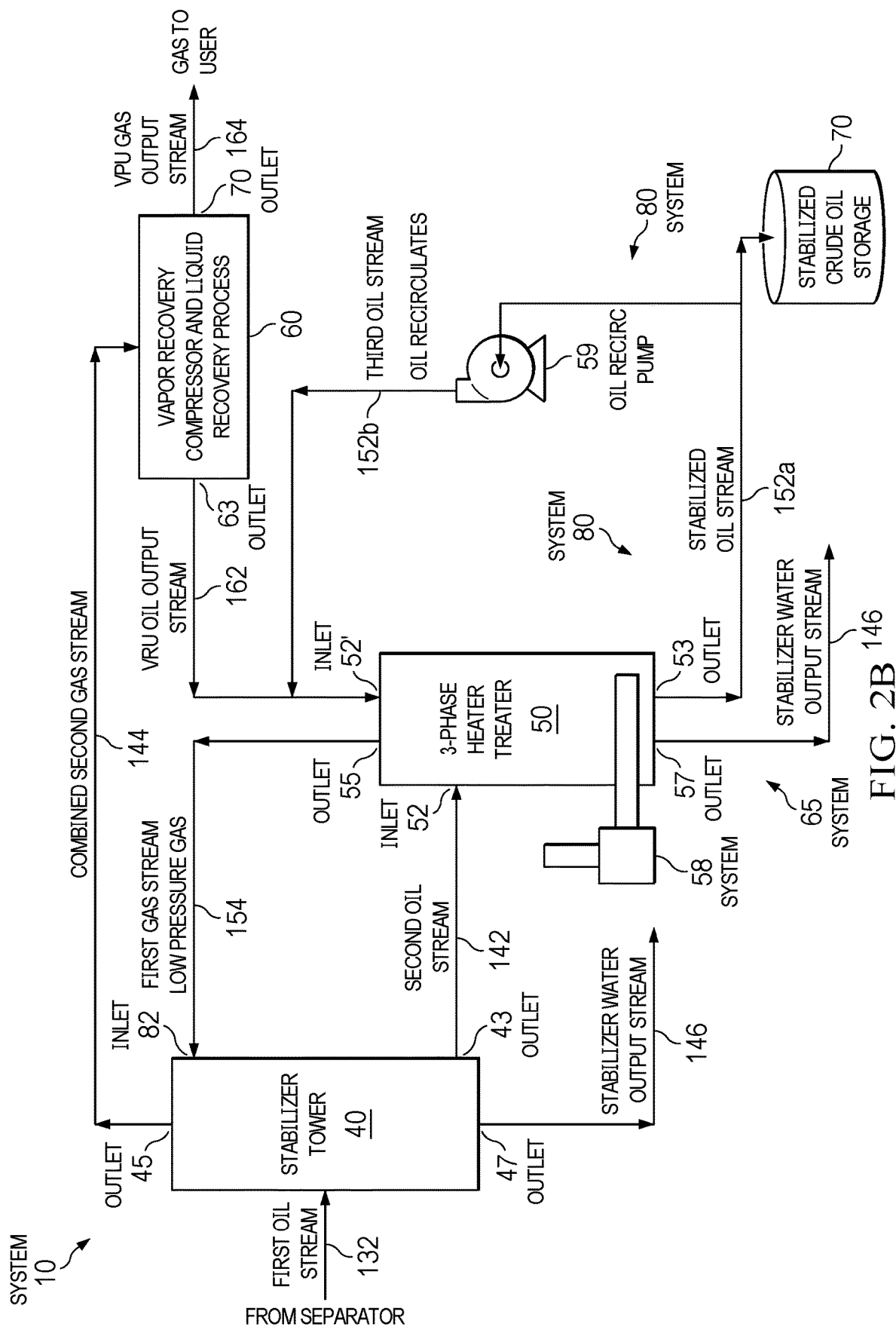
FIG. 2B is a simplified flow process diagram of a second portion, down-stream of the portion shown in FIG. 2A, of the example of a live crude oil conditioning process.

Of the separator output streams, gas stream 134 is typically suitable for use and can thus be sold to end users, and water stream 136 typically goes for water treatment, reinjection, or the like. As illustrated in FIG. 2B, oil stream 132 goes to stabilizer tower 40.

Pressure within stabilizer tower 40 typically is controlled by a gas back-pressure valve (or the like) to a pressure that often is no more than approximately 200 psi (14 bar). The liquid within tower 40 flows by gravity through a series of trays, packing, and/or other media for stripping of gas from the liquid. In this regard, the internal components of stabilizer tower 40 may be chosen and configured in any way, as will be understood by persons familiar with oil stabilization and stabilizer tower technology.

As described more fully below, stabilizer tower 40 includes an inlet 82 for receiving a heater treater gas output 154. Thus, the gas output of stabilizer tower 40 is referred to as a combined gas stream 144, also referred to as a combined second gas stream 144, as a gas outlet 45.

Vapor recovery unit (VRU) 60 includes a compressor, often a screw type, that receives the combined gas stream 144 from stabilizer tower gas outlet 45. VRU 60 can also include a demister, valves and controls, other conventional components. VRU packages are commercially available, as will be understood by persons familiar with oil stabilization technology.

Liquid from the compression is discharged from VRU 60 at an oil outlet 63 to yield a VRU output oil stream 162 (that is, condensate), which can be controlled to be approximately at heater treater pressure. Oil stream 162 enters into heater treater 50 at an oil inlet 52', which may be separate from heater treater inlet 52 that receives stabilizer tower oil output stream 142.

Gas that is pressurized to a desired pressure in VRU 60 is discharged at a gas outlet 70 to yield a VRU gas output stream 164 that go be piped to an end user, accumulated with other gas streams, such as separator output gas stream 134, and/or gas streams from other sources.

Heater treater 50 is illustrated in FIG. 2B as a horizontal heater treater. Heater treater 50 includes an inlet 52 for receiving stabilizer oil output stream 142, which typically is an emulsion of water, oil, and gas at approximately the stabilizer tower pressure. Heater treater 50 may include an oil dump valve, a gas back-pressure valve, a water dump valve and like process equipment and its instrumentation, as will be understood by persons familiar with heater treater technology in view of the information herein. Heater treater 50 may be of any type, such as vertical or horizontal, and may include combination of valves and their actuation, such as mechanical and pneumatic actuation. Chemical agents may be used to weaken the emulsifying agents, depending on the chemistry of the fluid in the heater treater, the process conditions, and the desired output properties.

Heater treater 50 also includes a burner system 58 that typically includes a burner, a fire tube, a burner management system, and a stack. The burner management system includes a thermostat, a gas burner valve, and a safety system for controlling temperature in the process, such as fluid temperature within heater treater 50. The fire tube is an indirect-type heat exchanger within heater treater 50 that transfers heat to the process fluid. The products of combustion exit the fire tube through the stack.

Thus, after initial degassing in the inlet portion of heater treater 50 near inlet 52, heat from the fire tube is transferred to the process fluid within heater treater 50, which raises the process temperature to (typically) 100 to 160 degrees F. Heating the emulsion in this regard decreases fluid viscosity, enhances the separation of water from the oil, and promotes gas release. Gas from the initial degassing and gas stripped from the emulsion via heating can be combined to yield a heater treater gas output stream 154, which is also referred to herein as third gas stream 154. As explained more fully below, gas output stream 154 is circulated back to recirculation gas inlet 82 of stabilizer tower 40 from a gas outlet 55 of heater treater 50.

Processing within heater treater 50 yields a stabilized oil output stream 152*a* at an oil outlet 53 and a water output stream at water outlet 57. Stabilized oil output stream 152*a* is at a temperature and pressure that enables it to be sent to and stored in a stabilized crude oil tank 70 that is at atmospheric pressure.

A portion, referred to herein as the oil recirculation stream 152b and the third oil stream 152b, of the oil output from heater treater 50 is recirculated from heater treater oil output 53 to oil inlet 52' where preferably it is combined with VRU oil output stream 162. As referred to above, the recirculation system 80 includes the oil recirculation stream 152b. A pump 59 (shown in FIG. 2B) moves oil recirculation stream 152b from heater treater oil outlet 53 to the second heater treater oil inlet 52'. Recirculation of oil via oil recirculation stream 152b is believed to enhance the conditioning process by increasing the volume of oil that is subject to treatment in heater treater 50.

Recirculation system 80 also includes gas recirculation stream 154 that is piped from heater treater gas outlet 55 to a stabilizer recirculation gas inlet 82. Typically, heater treater pressure is greater than stabilizer tower pressure, such that gas recirculation stream 154 is moved via the pressure difference without requiring additional components, such as a compressor. Typical pressures in the stabilizer tower 40 and heater treater 50 typically are between 5 and 150 PSI (0.4 and 10.4 bars), according to the desired operating conditions.

The inventors have demonstrated that oil stabilization process 10 enhances the volumetric flow rate of stabilized oil stream 152a. It is surmised that low pressure gas stream 154 from the heater treater flowing upwardly in stabilizer tower 40 in close contact with the oil emulsion dissolves or entrains gaseous hydrocarbons in the liquid stream, even while partial fractionation or distillation of the oil occurs in stabilizer tower 40 at typical stabilizer process conditions, such as 50 to 200 PSIG (3.4 to 14 bars), while retaining pentane and other higher hydrocarbons (such as C5+). Accordingly, it is believed that that fuel heating value and commercial value of stabilized oil stream 152a is not unduly adversely affected.

To illustrate a second example of system for conditioning crude oil, a system 210 for conditioning (stabilizing) live crude oil includes a separators 230a, 230b, and 230c, a stabilizer such as a stabilizer tower 240, a heater treater 250, a vapor recovery unit and scrubber 260, a stabilized oil tank 270, and an oil and gas recirculation system 280. Each of the components of system 210—including separators 230a-c, stabilizer 240, heater treater 250, components of vapor recovery unit and 260, and recirculation system 280—have a structure and function as generally described with respect to corresponding components of first embodiment conditioning system 10. System 210 further comprises sales gas scrubber 264, artificial well gas lift compressor 262, VRU discharge gas scrubber 268, flare gas knockout vessels 293, 295, water storage tank 273, high and medium pressure flare 291, and tank vent gas combustor 292.

Figure 3A:
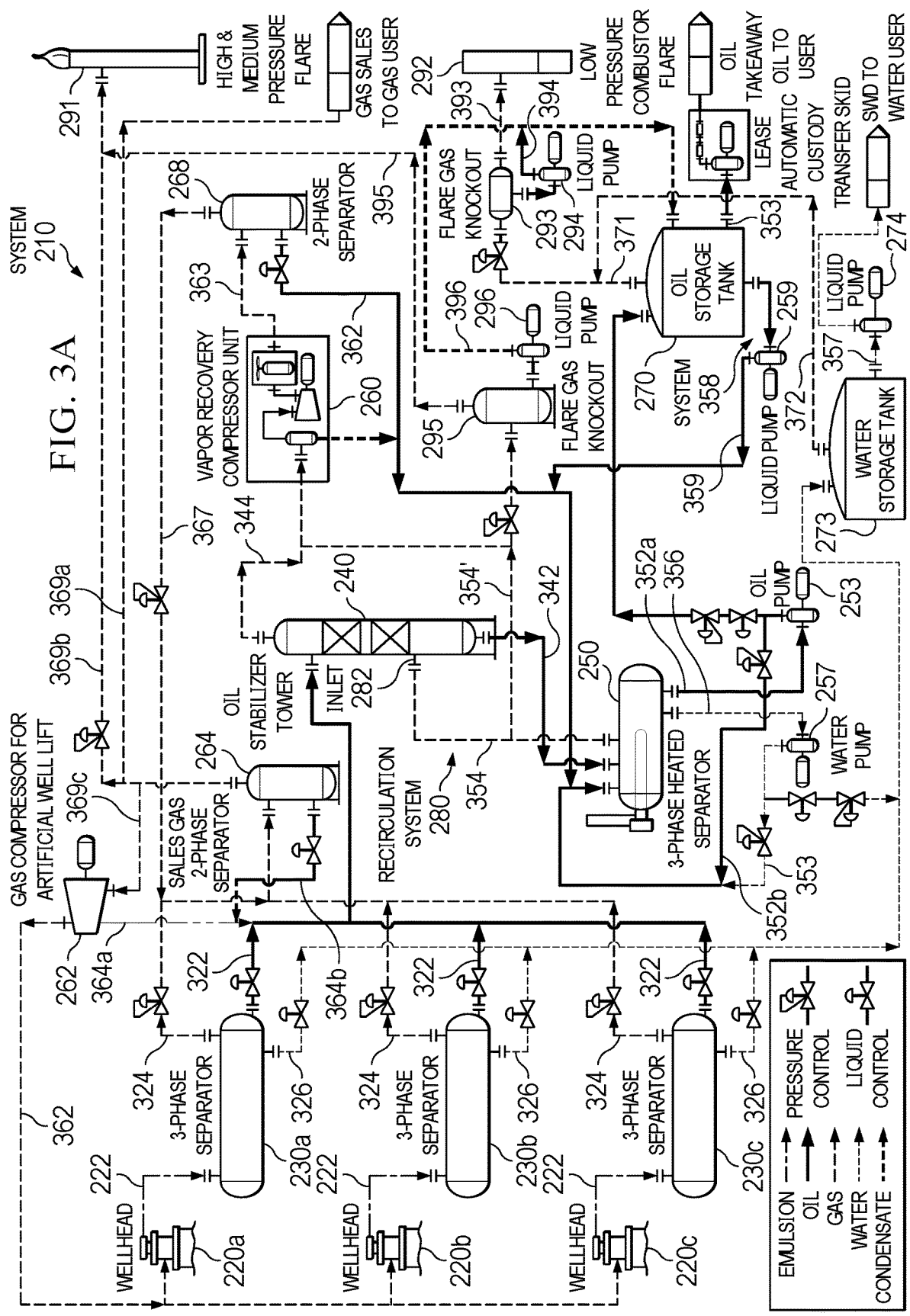
FIG. 3A is a flow process diagram of a second example of a live crude conditioning process.
Figure 3B:
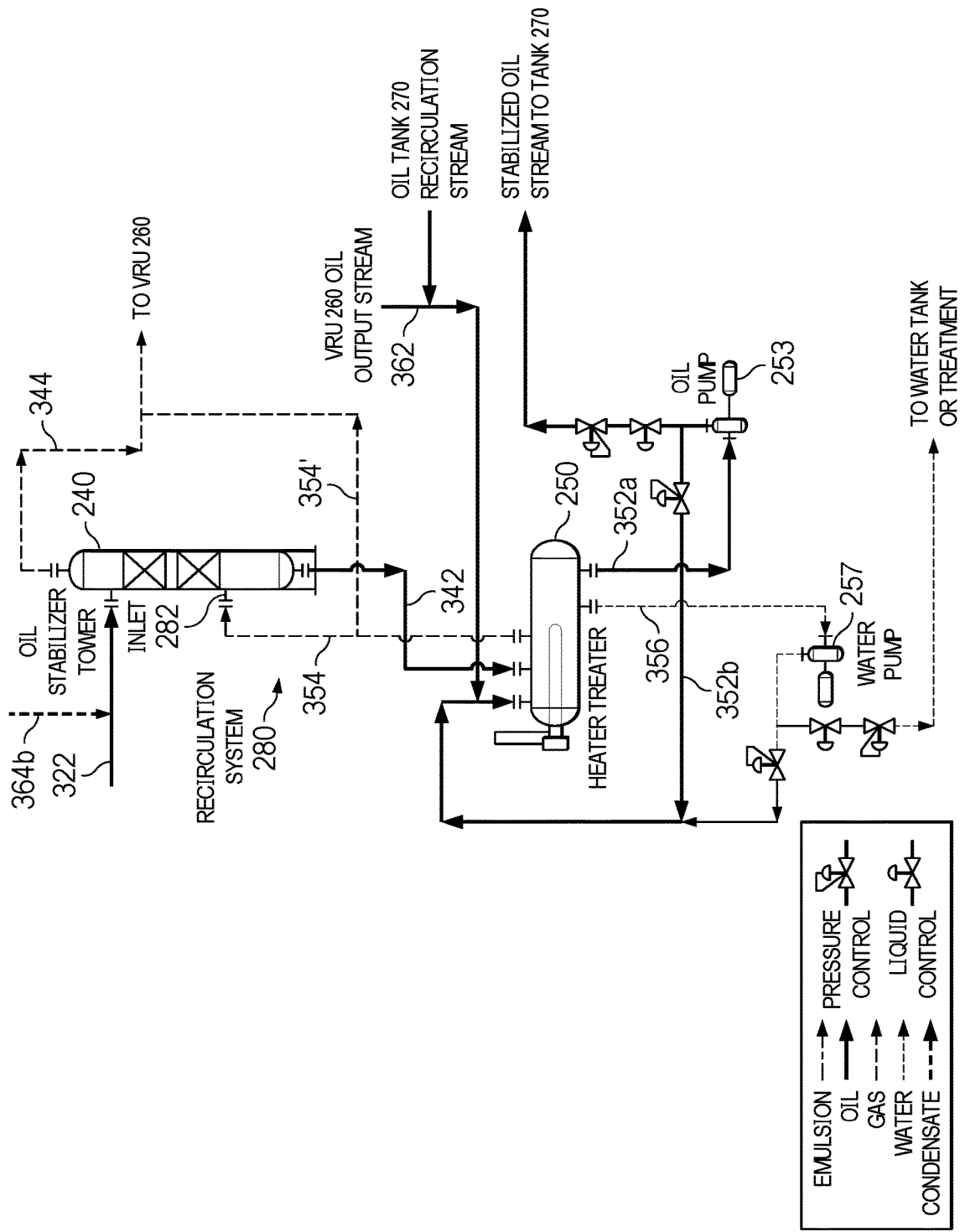
FIG. 3B is an enlarged portion of the flow process diagram of FIG. 3A.

As illustrated in FIG. 3A, each of three wellheads 220a, 220b, and 220c provide live crude to a corresponding separator 230a, 230b, and 230c (respectively). In embodiment of FIG. 3A, as set out in Table 1, the total live oil feed 222 to the three separators 230a, 230b, and 230c from the wellheads includes 3,450 BPD of oil and 6,000 MSCFD of gas. The live oil feeds in the embodiment of FIG. 3A has a pressure of 180 PSIG (12.4 bars) and a temperature of 90 degrees F. The outlets from 230a, 230b, and 230c are illustrated as oil stream 322, separator outlet gas stream 324, and separator outlet water stream 326. Oil stream 322 is at 90 degrees F. and has a pressure of 20 PSIG (1.4 bar), as the separator process results in a pressure decrease. Separators 230a, 230b, and 230b in FIG. 3A preferably are conventional horizontal, three-phase separators.

TABLE 1

| | STREAM/EQUIPMENT | | | | | | | | | | | | |
|---|---|---|---|---|---|---|---|---|---|---|---|---|---|
| | WELLHEAD OUTPUT | | | | | | | | | | | | |
| | 322 | 352a | 326 | 369a | 362 | 344 | 371 Item | 359 | 364a & 8b | 291 | 292 | 353 | 357 |
| | 1 INLET TOTAL FACILITY | 2 STAB OIL INLET | 3 STB OIL OUTLET | 4 TOTAL WATER TO TANKS | 5 TOTAL GAS TO USER | 6 GAS LIFT TO 3 WELLS | 7 STAB OVERHEAD GAS | 8 OIL TANK FLASH GAS | 9 RECYCLE OIL TO STAB | 10 LIQUIDS TO STAB | 11 HP FLARE DESIGN GAS | 12 LP FLARE DESIGN GAS | 13 OIL DELIVERY TO LACT | 14 WATER DELIVERY TO GATHERING |
| BPD OIL | 3,450 | 3,445 | 3,406 | — | — | — | — | — | 5,000 | 22 | — | — | 3,260 | — |
| BPD WATER | 6,900 | 3 | — | 6,987 | — | — | — | — | — | — | — | — | — | 6,897 |
| MSCFD | 6,000 | 237 | 220 | — | 6,175 | 1,800 | 298 | 9 | — | — | 12,500 | 6,290 | — | — |
| TEMP. F | 90 | 90 | 140 | 119 | 90 | | 120 | 87 | 110 | 100 | 86 | 120 | 120 | — | — |
| PRES. psig | 180 | 20 | 6 | 17 | 175 | 1,200 | 5 | 1 | 20 | 25 | 300 | 1 | — | — |

Stabilizer tower 240 yields a stabilizer oil output stream 342 and a stabilizer gas outlet stream 344 at 87 degrees F. and 5 PSIG (0.4 bar). As described more fully below, stabilizer tower 240 includes an inlet 282 for receiving a heater treater gas output 354. As illustrated in dashed line, heat treater gas output stream 354' may provide a bypass or a partial bypass around stabilizer 240 for all or a portion of gas stream 354. Gas stream 354' or stabilizer tower 240 output gas stream 344 may bypass VRU 260 by flowing all or a portion of gas streams 354' and 344 to flare gas knockout vessel 295. Flare gas knockout vessel 295 yields a condensate output stream 396 controlled by liquid pump 296 and a gas output stream 395 to flare 291. Condensate output stream 396 flows to stabilized oil storage tank 270. Oil storage tank 270 and water storage tank 273 yield a gas output stream 371 and 372, respectively. Gas output streams 371 and 372 flow to flare gas knockout vessel 293. Flare gas knockout vessel 293 produces a condensate stream 394 that is controlled by liquid pump 294, and combines with condensate output stream 396 to flow to oil storage tank 270, and a gas stream 393 that flows to tank vent gas combustor 292. Tank vent gas combustor 292 and flare 291 may be a single flare or combustor or a combination of both or like devices. Water storage tanks produce a water output stream 357 that is controlled by pump 274 to flow water stream 357 to a user.

Vapor recovery unit (VRU) 260 includes a pair of packaged vapor recovery units and a vapor recovery scrubber. Condensate 364a from a gas lift compressor 262 (FIG. 3A) and other process equipment, such as condensate 364b from sales gas scrubber 264, are fed into stabilizer tower 240. Condensate streams 364a and 364b in the embodiment shown is 22 BPD at 86 degrees F. and 25 PSIG (1.7 bar). Sales gas scrubber 264 yields a gas outlet stream 369a that can go to an end user for further processing or may produce a gas stream 369b to gas flare 291. A portion of gas stream 369a is sent to gas lift compressor 262 to supply gas stream 362 to wellheads 220a, 220b, and 220c for artificial well lift. VRU 260 yields an outlet stream 363 that is comprised of oil and gases that will feed into a two-phase separator 268. Separator 268 yields an oil output stream 362 that recirculates back to heater treater 250. Separator 268 also yields a gas output stream 367 that combines with gas stream 324.

Heater treater 250 receives stabilizer oil output stream 342. Heater treater 250 yields a gas output stream 354, which as explained above preferably is inserted into stabilizer tower 240 to form recirculation system 280. Heater treater 250 also yields a heater treater oil output stream 352a via an oil pump 253 and a heater treater water output stream 356 via water pump 257. Heater treater oil output 352a (that is, the stabilized oil output of the system 210) is 3,406 BPD at 140 degrees F. and 6 PSIG (0.41 bar). Stabilized oil output stream 352a is moved by oil pump 253 to stabilized oil tank 270. The rate of oil stream 353 from tank 370 (item 13 in Table 1 and FIG. 3A) is a factor of the capability of the Lease Automatic Custody Transfer Unit (LACT) and/or downstream customer limitation.

A portion of the heater treater output, an oil recirculation stream 352b may be recirculated from a heater treater oil output to oil inlet of the heater treater 250, as controlled by oil pump 253. A portion of the heater treater water output, a water recirculation stream 353, may also be recirculated from the heater treater 250 water output stream 356, as controlled by water pump 257.

An optional recirculation system 358, including an oil pump 259, may circulate stabilized oil from tank 270 to stabilizer 240, as needed to enhance the temperature, pressure, and/or other variables relating to the system. In the embodiment of FIG. 3A, oil recirculation stream 359 is optional and can yield approximately 5,000 GPD at 100 degrees F. and 20 PSIG (1.4 bar). Oil tank output 353 in the embodiment shown is 3,260 BPD.

The inventors have demonstrated that oil stabilization process 10 enhances the volumetric flow rate of stabilized oil stream 152b. It is surmised that low pressure gas stream 154 from the heater treater flowing upwardly in stabilizer tower 40 in close contact with the oil emulsion dissolves or entrains gaseous hydrocarbons in the liquid stream, even while partial fractionation or distillation of the oil occurs in stabilizer tower 40 at typical stabilizer process conditions (temperature and pressure) while retaining pentane and other higher hydrocarbons (such as C5+). Accordingly, it is believed that that fuel heating value of stabilized oil stream 152a is not unduly adversely affected.

In this regard, the following process flow data has been calculated, based on a typical live crude oil stream 122, to compare a prior art stabilization system to the stabilization method of system 10.

TABLE 2

|  | Wellhead Output | Prior Art Output | System 10 Output | Change |
| --- | --- | --- | --- | --- |
| Oil BOPD | 6703 | 6,566 | 6,684 | +1.8% |
| Oil Output Loss BOPD | 0 | −137 | −19 | 118 |
| RVP PSIG |  | 10 | 8 | 25% |
| Gas MMscfd | 17.89 | 18.29 | 18.17 | −0.70% |
| Water BWPD | 14,510 | 14,510 | 14,510 | — |

The prior art stabilization system in the second data column above is based on a conventional stabilizer model employing a first stage separator operating at 150 PSIG (10.3 bars), a heater treater operating at 50 PSIG and 120 degrees F., and a vapor recovery tower operating at 5 PSIG (0.4 bar). The data for stabilizer system 10 Output in the third data column above is based on a first stage separator 30 operating at 150 PSIG (10.3 bars), a stabilizer tower 40 operating at 6 PSIG, and a heater treater operating at 6 PSIG (0.41 bars) and 140 degrees F. The higher output temperature of gas 154 from the heater treater 50 flowing into stabilizer 40 is believed to enhance the conditioning process.

In this regard, the inventors understood that recirculation systems 80 and 280, including gas streams 154 and 354 of system 10 and system 210, enhances the stabilization process by (among other things) increasing the temperature in stabilizer tower 40 or 240 by introducing gas stream 154 or 354 from heater treater 50 or 250. The inventors surmise that the increased temperature within tower 40 improves separation and retention of higher hydrocarbons (such as C5+) into the oil stream.

The first row of Table 2 provides the oil output of the conventional stabilizer system and oil output of system 10 described herein—showing an improvement of in oil output per day of system 10 relative to the conventional stabilizer system. The second row of Table 20 provides the volumetric loss of oil from the available oil in the live crude from the first row. As shown, system 10 yields 118 more barrels per day more than the conventional stabilizer system, which is an improvement of approximately 1.8%. The units of Table 2 are million standard cubic feet of gas, barrels of oil per day, and barrels of water per day.

The fourth row of Table 2 provides the gas output of the conventional stabilizer system and the gas output of system 10—showing a decrease or "shrink" is gas production. In this regard, Table 2 reflects an increase in the volumetric flow rate of oil (that is, oil swell or uplift measured by stabilized oil stream 152 a) that is greater benefit than decrease in volumetric flow rate of the gas (that is, the sum of separator gas output stream 134 and VRU gas output stream 164). Further, because of typical pricing structures in the oil and gas industry, a unit increase in stabilized oil production would outweigh a decrease in gas production of the same percentage magnitude. Thus, even if the magnitude of the percentage changes in were equal, system 10 would enhance the stabilization process compared with the conventional system.

The third row of Table 2 provides the Reid Vapor Pressure (RVP) of the oil output. RVP is a property of the fuel at standard conditions—absolute vapor pressure exerted by the vapor of a liquid and any dissolved gases at 100 degrees F., according to test method ASTM-D323. Thus, RVP is a measure of the inherent volatility of the stabilized oil stream 152a and correlates to losses of the gas output to the atmosphere. As reported in Table 2, RVP of the gas output from the conventional stabilizing system is reduced from 10 PSIG (0.7 bars to 8 PSIG (0.55 bars) by employing stabilizer system 10.

Fugitive emissions include leaks and other irregular releases of vapors or gasses from a pressurized processes, equipment, valves and piping, and the like. It is believed that the magnitude of fugitive emissions of hydrocarbons is related to pressure. Accordingly, the decrease in RVP, reflecting a decrease is actual pressure, of system 10 compared with that of the prior art (illustrated in Table 2) corresponds and illustrates a decrease in fugitive emissions of conditioning system 10.

The systems and processes described herein refer to process flows from and to components, and/or that a component receives or is adapted to receive a process flow from another component. In this regard, these process flow terms encompass flow directly from the first specified component to the second specified component without major process equipment in between, but including piping, valves, pressure relief devices, safety and monitoring devices, instrumentation, and the like as needed. The description is not limited by prohibiting major process equipment or processes between the first specified component to the second specified component, as it is understood that components, sub-systems, and processes may be added between any of the components (such as wellhead 20 or 220a-c, separator 30 or 230, stabilizer tower 40 or 240, heater treater 50 or 250, VRU 60 or 260, and tank 70 or 270), and that the components can be modified in many ways, consistent with the broad conception of the invention and defined in the claims.

The process data provided herein is design data; actual operating data may vary according to change in condition and/or desired output and the like, as will be understood by persons familiar with oil and gas processing technology. Further, the process data provided in the specification is or are examples which are not intended to limit the scope of the invention.

The description herein describes particular examples of components, systems, and processes. The present invention is not limited to the particular components, systems, and processes specified herein. Rather, it is intended that the scope of the present invention be measured by the claims, without viewing any components, systems, or processes of the specification as essential. It is also understood that a person familiar with crude oil stabilization technology would understand that many terms used herein have established meaning that is specific to the oil and gas industry and/or oil stabilization technology, and that the terms inherently include many details that are not necessary to recite.

Further, the information in the Background section describes conventional oil stabilization technology and components. It is not intended to disclaim any subject matter for any component, sub-system, or system, as the preferred embodiments described in the specification incorporate aspects of the conventional technology.

What is claimed:

1. A process of increasing swell or reducing fugitive emissions or both in an oil conditioning process, the process comprising the steps of:
    a. receiving a live crude oil stream into a separator, the live crude oil stream including at least an oil component and a gas component;
    b. separating a first gas stream from the live crude oil in the separator to create at least a first oil stream;
    c. receiving the first oil stream from the separator into a stabilizer tower;
    d. separating a second gas stream from the first oil stream in the stabilizer tower to create a second oil stream;
    e. receiving the second oil stream into a heater treater;
    f. separating a third gas stream from the second oil stream in the heater treater to create a stabilized oil stream; and
    g. circulating the third gas stream from the heater treater to the stabilizer tower wherein the third gas stream combines with the second gas stream to create a combined second gas stream.

2. The process of claim 1 further comprising the steps of:
    h. receiving the combined second gas stream into a vapor recovery unit (VRU);
    i. producing a VRU gas output and a VRU oil output; and
    j. receiving the VRU oil output into the heater treater.

3. The process of claim 1 further comprising the step of moving the stabilized oil stream to a stabilized oil tank; whereby the stabilized oil stream has a greater volumetric flow rate, measured in barrels per day (BPD) at the stabilized oil storage tank, than the volumetric flow rate of the oil component of the live oil stream, measured in BPD.

4. The process of claim 2 further comprising the step of recirculating a third oil stream to the heater treater; wherein the third oil stream comprises a portion of the stabilized oil stream.

5. The process of claim 4 further comprising the step of combining the third oil stream with the VRU oil output upon or before entering the heater treater.

6. The process of claim 2 further comprising the step of providing the VRU gas output to a user.

7. The process of claim 6 wherein providing the VRU gas output to the user includes using a compressor.

8. The process of claim 1 wherein the step (a) of receiving a live crude oil stream into a separator includes receiving a live crude oil stream fed directly from a well head.

9. The process of claim 1 further comprising the step of sending the first gas stream to a user after the step (b) of separating a first gas stream from the live crude oil stream in the separator.

10. The process of claim 1 further comprising the step of producing a heater treater water output from the second oil stream, thereby at least partially dewatering the second oil stream in the heater treater.

* * * * *